June 19, 1956     C. V. B. LA MOTTE     2,751,081
WATER DEMINERALIZER
Filed Feb. 12, 1954
FIG. 1.
FIG. 2.
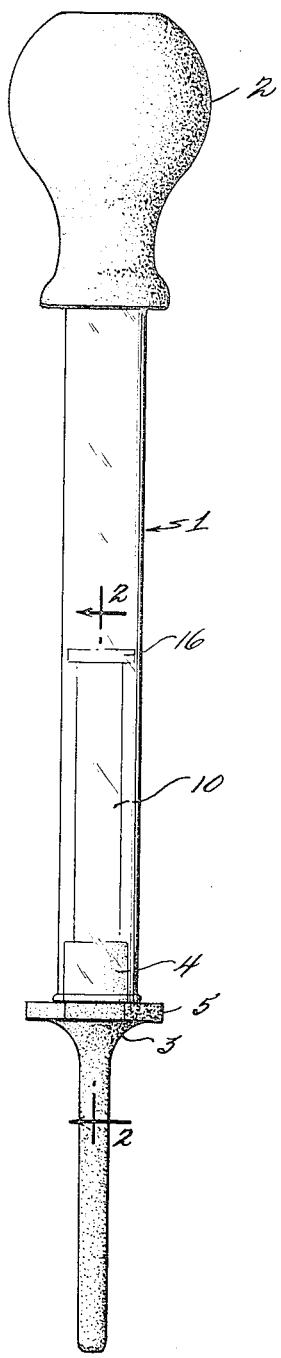
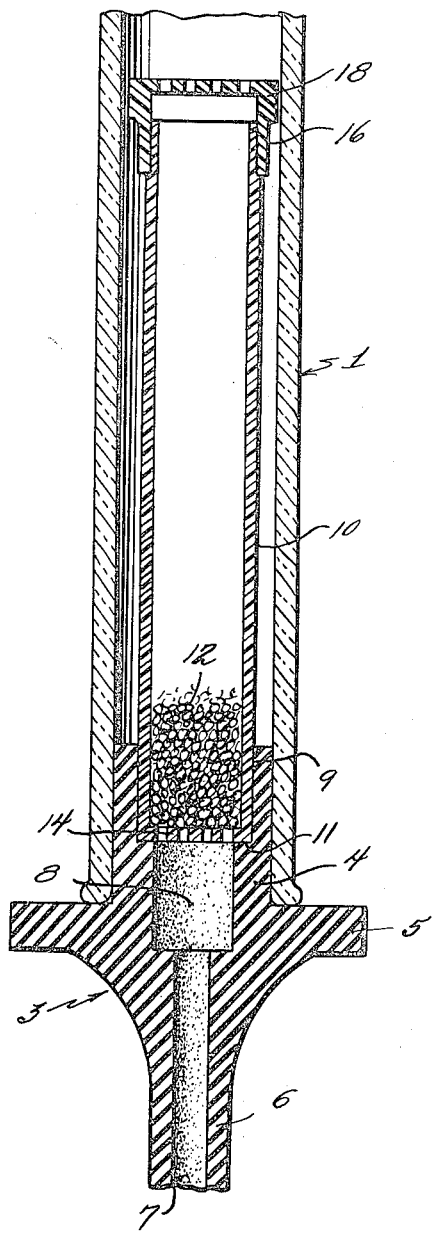
INVENTOR.
CHARLES V. B. LAMOTTE
BY
*Semmes & Semmes*
ATTORNEYS

United States Patent Office 2,751,081
Patented June 19, 1956

2,751,081

WATER DEMINERALIZER

Charles V. B. La Motte, Towson, Md.

Application February 12, 1954, Serial No. 409,819

3 Claims. (Cl. 210—24)

The present invention relates to water purifiers and more particularly to an improved apparatus of the portable type for effecting a demineralization of water.

Demineralizing agents, in particular anion and cation absorbents or exchangers, are presently available for water treatment. In some commercial installations provision is made for treating large quantities of water by directing the entire flow of water in use through special equipment in which one or more masses of ion exchange material is present. Customarily a dual system is employed in order that one bank may be in service while the second is being activated, permitting uninterrupted operation of the equipment.

Another common device is an attachment to be placed on the ordinary water tap by means of which the water passing through the body of ion exchange material contained therein is at least partially demineralized.

For the treatment of even lesser quantities of water provision is made for permitting percolation thereof through a charge of ion exchange material interposed between suitable receptacles.

The known methods of water demineralization are marked by undesirable features. For example, a large scale operation is expensive to install and to maintain. Furthermore, treatment of all the water used in the home is unnecessary. The smaller units do not enable a sufficiently complete water treatment to warrant their use except perhaps to serve as a filter or are unduly time consuming as in the percolation method.

One object of the present invention is to provide a portable water demineralizer in which the water is circulated through a body of demineralizing media to enable an increased efficiency of the purification process.

A second object of my invention is the provision of a portable water demineralizer through which the rate of flow of the water undergoing treatment may be regulated.

A further object of the invention is to provide a portable water demineralizer which effects partial purification of water during charging forms a chemically pure reservoir for this water and effects further purification thereof during discharge.

Other objects and advantages of the present invention will be apparent from the following description of a preferred embodiment thereof, reference being had to the accompanying drawing, wherein:

Figure 1 is a side view of the water demineralizer constructed in accordance with the invention; and Figure 2 is a fragmentary sectional detail view, on an enlarged scale, taken substantially along the line 2—2 of Figure 1.

Briefly stated, the present invention contemplates a water demineralizer substantially in the form of a bulb syringe containing within its body a charge of ion exchange media so disposed as to engage all the water entering and leaving the apparatus under a controllable rate of flow.

Referring to the drawing, a cylindrical container 1 of glass or transparent plastic is closed at one end with a bulb 2 of rubber, said bulb having a capacity at least as large as the volume of the container 1. The opposed end of the cylindrical container 1 is fitted with a closure 3 of rubber or comparable material having a body portion 4 projecting inwardly of the container 1 with an intermediate flange collar 5 defining the maximum entry, and a tip portion 6 depending therefrom. The collar 5 also serves as a bumper or protective ring for the container 1.

The closure 3 is provided with a conduit 7 to permit a flow of water into and out of the container 1. At an intermediate point along the conduit there is provided a chamber 8 and within the body portion 4 there is a further increase in diameter of the conduit 7 to provide an orifice 9 in which a cylindrical capsule 10 of glass or transparent plastic is frictionally secured and is seated upon an annular shoulder 11.

The capsule 10 contains a charge 12 of demineralizing media in particulate or spongious form which may fill completely or only partially the capsule. The capsule is closed at its lower end with a perforated plate 14 which permits passage of fluids therethrough. If necessary, a layer of fabric, mineral wool or the like (not shown) may be superposed on said plate to prevent escape of the demineralizing media. The upper end of the capsule 10 is fitted with a perforated cap 16 of rubber or plastic having an annular flange 18 of an outer diameter approximating the inner diameter of the container 1 to retain the capsule concentrically within the container and to preclude undue lateral movement thereof.

To use the illustrated device the bulb 2 is compressed to expel air from the container 1, and the tip portion 6 is immersed in a body of untreated water. By releasing the bulb 2, the water is drawn upward into the container 1 through the conduit 7 and is subjected to the demineralizing action of the media 12 within the capsule 10. The purified water held within the container 1 is discharged therefrom by compression of the bulb 2 and again is subjected to the demineralizing action of the media 12 within the capsule 10. Of course, only a portion of the treated water in the container 1 need be discharged at one time. The residence time of the water passing through the capsule can be regulated by manipulation of the bulb 2.

Numerous demineralizing agents may be employed in charging the capsule 10. Particularly advantageous results may be obtained by utilizing such cation exchangers as the nuclear-sulfonic polystyrene resins commercially available in such forms as "Dowex 50," manufactured by the Dow Chemical Company, "Amberlite IR-120," manufactured by Rohm and Haas Company and "Permutit Q," manufactured by Permutit Company, and anion exchangers of the quaternary amine-polystyrene type resins available in such form as "Dowex 2" and "Amberlite 1RA-410," or the aldehyde-quanidine condensation products. It is not, however, intended to limit the invention to the use of any specific ion exchange medium.

When utilizing cation and anion active resins in combination, it is generally preferred to supply them in substantially chemically equivalent amounts. Although satisfactory results may be achieved using the exchange resins separately, that is as distinct and alternate layers in filling the capsule, it is generally preferred to utilize them in the form of an intimate mixture. Such a mixture is commercially available as "Amberlite MB-3" which contains "Amberlite IR-120" and "Amberlite 1RA-410," the former in slight chemical excess. This mixture has the added advantage of being obtainable with a pH sensitive dye associated with the anion exchange resin, the dye being changed from blue to yellow when the anion exchange resin is exhausted and replacement of the demineralizing capsule is necessary.

Regeneration of spent ion exchange resins is not contemplated since the small individual charges can be readily and inexpensively replaced.

It is entirely possible that demineralizing capsules containing special charges will have a special utility in the present device. For example, in areas having a water supply in which are present excessive amounts of certain objectionable minerals, the demineralizer media filling for the capsules can be so adjusted as to handle selectively particular adulterants. Again the capsule charges may contain agents which will dissolve in the water circulating therethrough should it be desired to add other chemicals to the demineralized water.

The foregoing description of a preferred embodiment of my invention is susceptible of various modifications and it will be understood that changes in the construction and in the arrangement of the several elements thereof may be made without departing from the scope of the invention as defined in the appended claim.

What I claim is:

1. A water demineralizing device which comprises a cylindrical container adapted to receive and hold a measured quantity of water, a closure element having an elongated tip projecting outwardly therefrom and containing a longitudinal conduit centrally thereof secured to one end of said container, an integrated body of particulate demineralizing material removably secured within said closure element at the inner end of the conduit and extending into said container, means secured to the opposed end of the container to induce a flow of water into the container through said conduit and body of demineralizing material and subsequently to force a flow of water out of said container through said conduit and body of demineralizing materials.

2. A water demineralizing device as defined in claim 1, wherein the integrated body of demineralizing material is confined in a cylindrical capsule having perforated ends for water passage therethrough.

3. A water demineralizing device as defined in claim 1, wherein the water flow therethrough is controlled by expansion and compression of a rubber bulb secured to the end of said container.

References Cited in the file of this patent

UNITED STATES PATENTS

| | | |
|---|---|---|
| 813,256 | Shin-Ichi Takaki | Feb. 20, 1906 |
| 1,751,671 | Webb | Mar. 25, 1930 |
| 1,774,004 | Haslett | Aug. 26, 1930 |
| 2,237,213 | Brown | Apr. 1, 1941 |
| 2,339,870 | Mathis | Jan. 25, 1944 |
| 2,525,497 | Monfried | Oct. 10, 1950 |

FOREIGN PATENTS

| | | |
|---|---|---|
| 295,004 | Great Britain | Dec. 20, 1928 |
| 493,539 | Great Britain | Jan. 6, 1937 |